July 7, 1942.　　H. W. BODENDIECK　　2,288,776
CLAMP STICK
Filed Oct. 12, 1939　　3 Sheets-Sheet 3
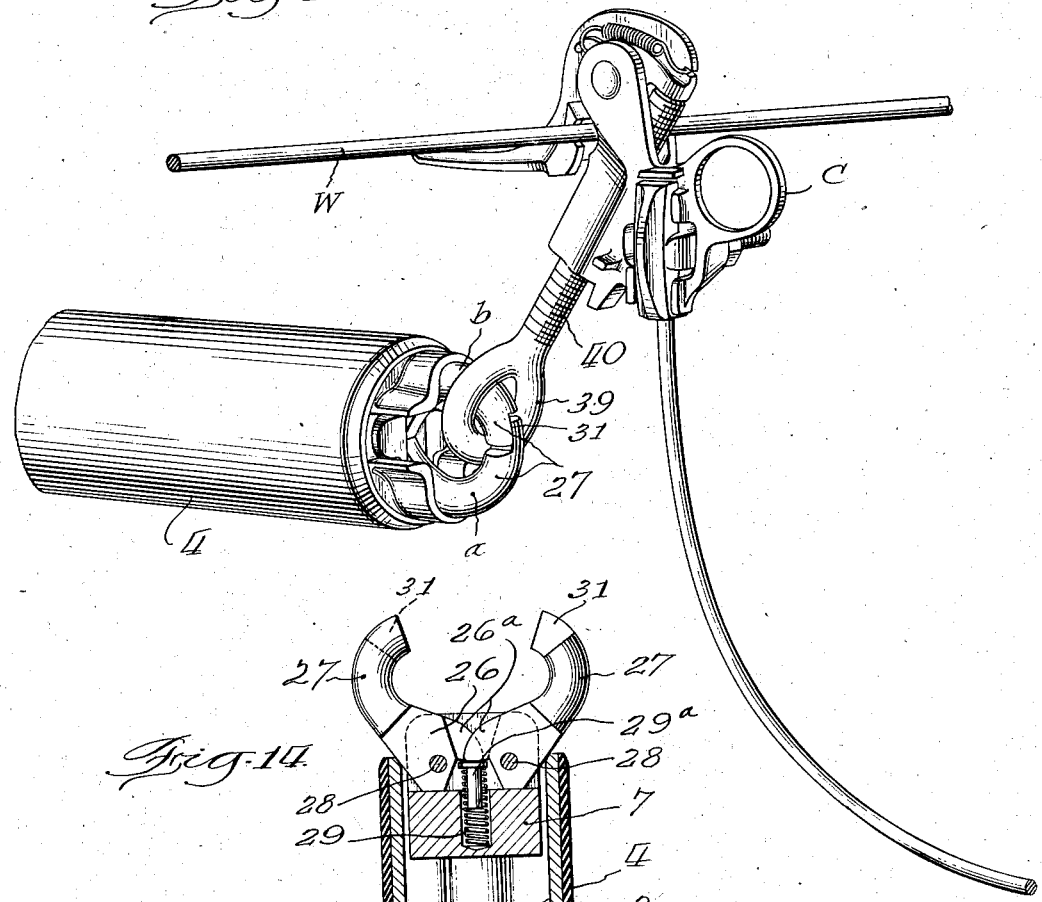
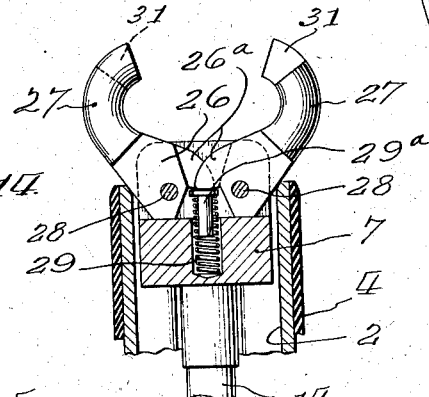
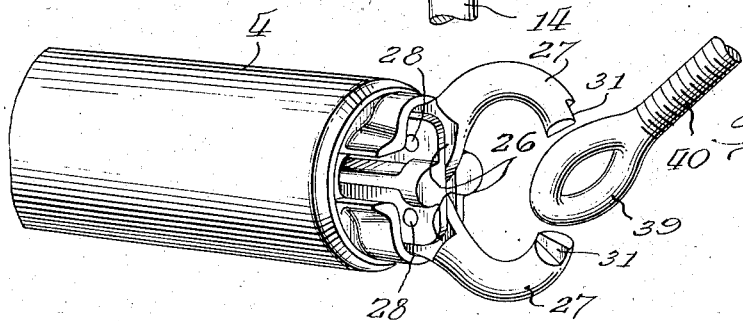
Inventor.
Henry W. Bodendieck Patented July 7, 1942

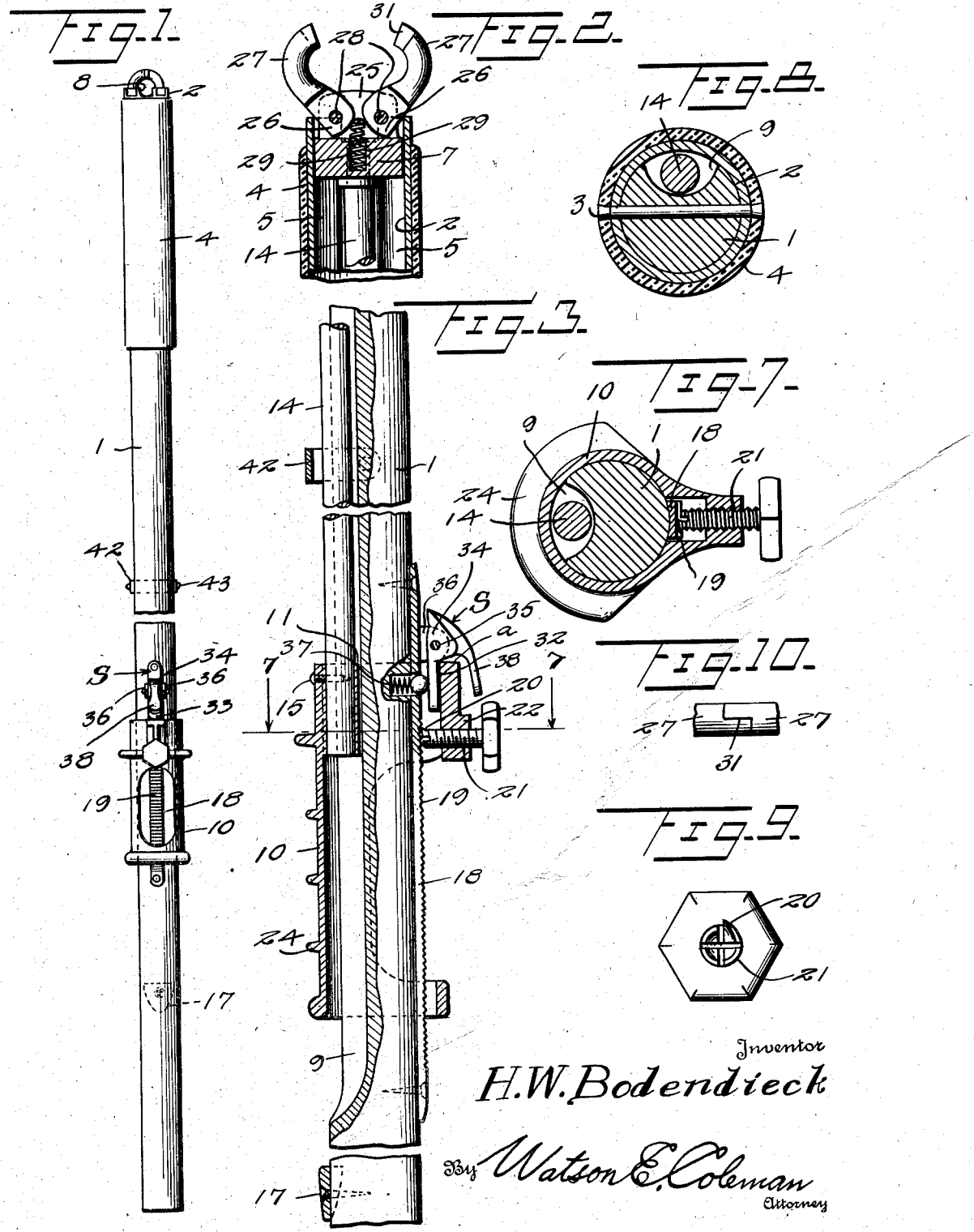

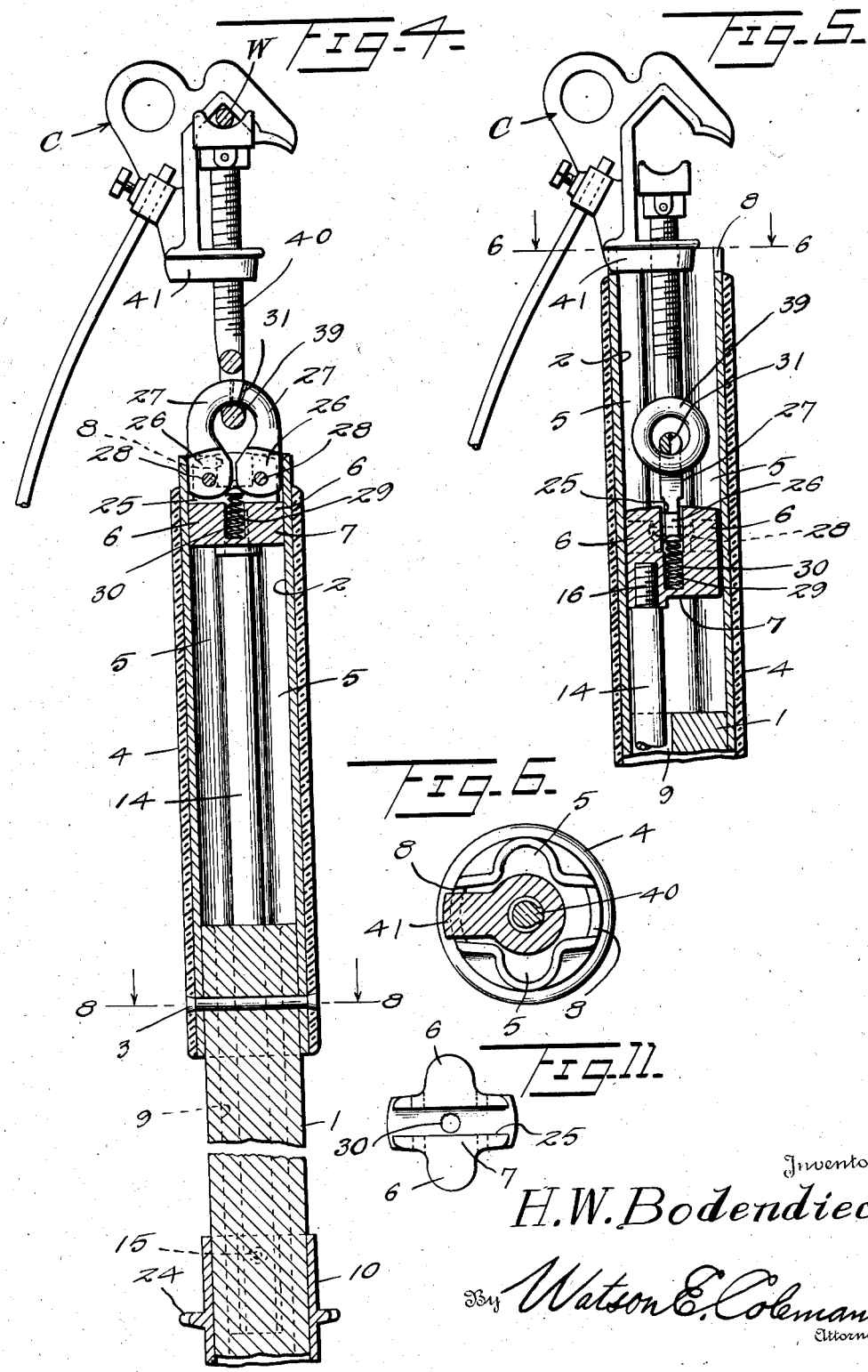

2,288,776

UNITED STATES PATENT OFFICE 2,288,776

CLAMP STICK

Henry W. Bodendieck, Taylorville, Ill., assignor to A. B. Chance Company, Centralia, Mo., a corporation of Missouri Application October 12, 1939, Serial No. 299,178

8 Claims. (Cl. 81—112)

The present invention relates to clamp sticks, and is particularly concerned with clamp sticks adapted to be used for attachment to high tension lines of conductors of the type having a clamping member actuated by an eye screw.

The present application is a continuation-in-part of my prior application, Serial No. 161,515, filed August 28, 1937, for Clamp sticks.

One of the objects of the invention is the provision of an improved clamp stick which is adapted to be more conveniently attached and detached from the eyes of the high voltage clamping connectors which are adapted to be used on high tension lines, regardless of the position in which the operator may be with respect to the location of the clamping connector.

Another object of the invention is the provision of an improved clamp stick which provides a maximum degree of safety with respect to the handling of a clamp, on account of the fact that the clamp is definitely and securely locked in the clamp stick and cannot be detached, dropped, or removed except by definite action on the part of the operator.

Another object of the invention is the provision of an improved clamp stick which may also be used for picking up loose high tension conductors with safety, and which may be used for handling all sorts of high tension devices that are adapted to be attached to a clamp stick having an eye.

Another object of the invention is the provision of an improved clamp stick of the class described, which is provided with three different positions, to wit, first, a position in which the eye of a clamp stick is open; and second, a position in which the eye of the clamp stick is closed, but the clamp has its eye in universal engagement with the eye of the clamp; and third, a position in which the screw of the connector or clamp is drawn down into a housing which engages the body of the clamp and holds it in fixed position with respect to the clamp stick so that the clamp can be twisted to bring it into proper position with the high tension line, which may involve the bending of the conductor lead.

Other objects and advantages of the invention will be apparent from the following description and the accompanying drawings, in which similar characters of reference indicate similar parts throughout the several views.

Referring to the drawings,

Fig. 1 is a side elevational view of a clamp stick constructed according to the present invention, with the eye of the tool in closed position;

Fig. 2 is a fragmentary sectional view taken on a plane passing through the axis of a handle, with the jaws in elevation;

Fig. 3 is a similar fragmentary sectional view, taken on thte same plane as Fig. 2, showing the structure of the lower part of the handle;

Fig. 4 is a vertical sectional view of the clamp stick as applied to a hot wire clamp of the eye screw type, with the clamp in elevation and the clamp stick in section, on a plane passing through the axis of the stick, the clamping jaws being in elevation;

Fig. 5 is a fragmentary sectional view similar to Fig. 4, with the parts of the clamp stick in the position which they assume when the hot wire clamp is fixedly secured to the clamp stick;

Fig. 6 is a sectional view, taken on the plane of the line 6—6 of Fig. 5, looking in the direction of the arrows;

Fig. 7 is a sectional view, taken on the plane of the line 7—7 of Fig. 2, looking in the direction of the arrows;

Fig. 8 is a sectional view, taken on the plane of the line 8—8 of Fig. 4, looking in the direction of the arrows;

Fig. 9 is a view in end elevation of the securing member for holding the parts in any of a number of different positions;

Fig. 10 is a fragmentary end elevational view of the clamping jaws of the tool when closed;

Fig. 11 is a plan view of the movable member or supporting member for the clamping jaws;

Fig. 12 is a view in perspective of the clamp stick, showing one of the extreme positions which is encountered in applying a clamp to a wire, and in which the jaws of the present clamp stick are most readily apparent;

Fig. 13 is a fragmentary view in perspective of the same clamp stick and clamp, showing the positions which the parts take when the clamp stick is removed from the eye of the screw bolt which forms a part of the hot wire clamp.

Fig. 14 is a fragmentary sectional view similar to Fig. 2, showing a modified form of jaw structure.

Referring to Figs. 1 and 2, the clamp stick preferably includes a handle 1, consisting of a wooden pole of suitable length, having suitable insulating characteristics for use on high tension lines. For example, the pole 1 may be of solid fir, kiln-dried to remove moisture, and varnished to exclude moisture.

Such wooden poles have been tested and found to withstand voltage of 75,000 volts per foot applied for five minutes, without flash-over.

One end of the handle 1 extends into an elongated tubular socket member 2, which is preferably enclosed and completely covered by a tubular sheath 4 of insulating material, such as vulcanized fiber. The sheath 4 and metal tube 2 may be secured to the pole by means of a suitable through pin 3. The tubular member 2 has its inner wall formed with a substantially cruciform opening, extending from the upper end of a socket 2 to the inserted end of the handle 1, and this tubular member is provided with the internal guide grooves 5 for the outwardly extending lugs 6, carried by the block or cross head 7 of the tool or holding member.

The outwardly extending lugs 6 are four in number, and the wall of the socket member 2 projects above the insulating tube 4, except for a pair of oppositely disposed slots 8, which are disposed on a plane at right angles to the grooves 5. The pole is preferably provided with a longitudinally extending groove 9, which is a continuation of one of the grooves 5 in the socket member 2.

A dowel rod 14, preferably of hard maple, is slidably mounted in the groove 9. It has its end fixedly mounted in a socket 11, formed in a cast metal sleeve 10, which is slidably mounted on the handle 1. For example, the rod 14 may be secured in the socket 11 by means of a wood screw 15.

The outer end of the rod 14 may be threaded as at 16 and secured in a complementary threaded bore in the cross head, H, to which it is fixedly secured in such position that the sleeve 10 and rod 14 are adapted to move the cross head upward and downward in the socket 2, but relative rotation between the cross head and the socket 2 is prevented by the lugs 6 and grooves 5.

The cross head 7 is provided with a transversely extending slot 25, which extends through a pair of the opposed lugs 6. Pivotally mounted within the slot 25 are a pair of jaws 27, which are identical in construction, but oppositely mounted by means of rivets 28, passing through the jaws and through the cross head 7.

The jaws 27 each have a flattened lower end portion, which serves as a pivot plate 26, having a bore for receiving the rivet 28, and each jaw extends upward and curves inward in such manner that the combination of the two jaws forms an eye. The abutting ends of the jaws 27 are provided with oppositely disposed notches or recesses 31 so that the remaining parts of the jaws may overlap at the end in forming the eye, when the jaws are closed.

The cross head 7 is provided with a centrally located spring socket for receiving a helical compression spring 29, which compression spring engages the lower edges of the pivot plates 26 of the jaws 27 and urges both jaws apart.

Referring to Fig. 14, this is a modification in which each of the pivot plates 26 is also oppositely recessed, so that the flanges 26A of the pivot plates in this modification overlap each other and simultaneously engage a spring pressed plunger 29A that is urged upward by spring 29.

The pivots 28 of the jaws and the outer edges of the jaws 27 are so arranged with respect to the size of the metal tube 2 that when the jaws are closed to form an eye they are of the same width as the projecting lugs of the cross head 7, so that the jaws may then be drawn into the tubular socket 2.

When the jaws are expanded by the spring 29 to the position of Fig. 2, they extend beyond the confines of the tubular member 2 and engage the upper edges of the tubular member 2.

The cross head 7 and jaws 27 are adapted to be used in a plurality of different positions, the one position, with the jaws open, being shown in Fig. 2. Another position, with the jaws closed, is shown in Fig. 1 or Fig. 4. In this position the cross head 7 has been drawn into the socket 2 far enough so that the upper edges of the socket 2 engage the outside of each jaw 27, and downward movement of the cross head 7 into the socket 2 causes the jaws to be forced together by the upper edge of the socket 2.

In the position of Fig. 4 the jaws 27 form an eye of sufficient size so that the eye screw 40 of a hot wire clamp 6 has a universal movement with respect to the eye 27 of the clamp stick.

The hot wire clamp adapted to be handled by this clamp stick, has a body 41, which may be screwed to a wire W by means of its clamping jaws, which are actuated by the eye screw 40. The body 41 of the clamp also has a downwardly extending transverse lug which is adapted to be received in the groove 8 between the upwardly projecting walls of the tube 2 when the cross head 7 is drawn down to the position of Fig. 5.

In this position, such tension may be placed on the rod 14 that it draws the cross head 7 downward until the flange 41A on the clamp 6 engages the top of the tube 2 and the rib 41 is in the slot 8. Then the clamp is fixedly held in the clamp stick against any rotative or other movement.

I shall now describe the arrangements at the sleeve 10 by means of which the cross head and jaws may be manipulated into these various positions.

The sleeve 10 may comprise a cast metal member, preferably made of non-corroding metal, such as aluminum, of substantially cylindrical shape and provided with a plurality of spaced peripherally extending ribs 24 for better grip with the hand. At its upper end the sleeve 10 is provided with a radially extending body 22, having an inner groove communicating with the cylindrical bore of the sleeve 10. The body 22 is provided with a transverse threaded bore for receiving the threaded thumb screw 21 for securing the handle 10 in any of a multiplicity of different positions.

For the purpose of limiting the movement of the sleeve 10 in a predetermined way, the pole 1 is preferably faced, on the side where the thumb screw 21 is located, with an elongated serrated metal strip 18, secured to the pole by a plurality of wood screws. The serrated strip 18 has a plurality of cast teeth 19 formed in its side for better engagement with the end of the thumb screw 21.

In addition to the wood screws which secure the metal keeper strip 18 to the pole 1, the pole has a socket for receiving an inwardly projecting cylindrical formation that is provided with a socket for receiving a spring and ball 37.

The ball, which is urged outwardly by the spring, acts against a pivoted latching member 34, which is pivotally mounted on the strip 18 by a rivet 35, passing through outwardly projecting ears 36 on the strip 18.

The latching lever 34 is also indicated by the large letter S, signifying a stop; and it is preferably provided with a downwardly extending leg 32 adapted to be received in the groove of the sleeve 10. The latching lever 34 also has a downwardly extending tail piece 38, which is located outside the sleeve 10 and adapted to be engaged by the thumb, to press the latching lever downward far enough to cause the part 32 to be received in its groove.

The ball and spring 37 normally urges the upper point of the latching lever 34 into engagement with the strip 18, which places the member 32 in such position that it engages the end of the sleeve and prevents the sleeve 10 from moving into the position of Fig. 2, except when the tail piece 38 is pressed with the thumb to retract the ball and spring into their socket.

The operation of the invention is as follows: With the clamp stick in the position of Fig. 2, the jaws may be held open by using the clamping screw 21. After this screw has been released, the jaws may be drawn to closed position by pulling downward on the sleeve 10 with respect to the handle 1. This causes the upper edge of socket 2 to cam the jaws 27 together against the spring 29. The jaws may be used in this way not only for securement to the eye of a hot wire clamp of the type shown in Fig. 12, but it may be used for picking up energized high voltage conductors that have broken loose, or for pulling fuses, or for actuating switches, or myriad other operations in which it is desirable to handle an energized conductor or device.

When it is used for applying hot wire clamps, the eye of the screw 40 of the clamp C (Fig. 4) will, of course, be secured in the eye which is formed by the two jaws 27.

There is no possibility of even a relatively small wire escaping from the eye of the jaws 27 because of the overlapping of the two jaws.

In manipulating the clamp C, the sleeve 10 should then be drawn down to such a position that the clamp has its rib in the groove 9 and the clamp is fixedly secured to the clamp stick. This position of the sleeve may be maintained by using the clamping screw 21 against the serrated strip 18. Then the clamp C, which has previously had its jaws retracted, and which has been secured to a suitable lead, may be applied to a high tension wire W, and, as is usually necessary, the clamp C may be twisted to bend the lead until the wire W is disposed in the direction of the grooves in the jaws of the hot wire clamp.

Thereafter the operator may release the clamp and screw 21 on the sleeve 10 and push upward on the sleeve until the parts reach the position of Fig. 4.

This position cannot be passed because the sleeve hits the end of the stop 32 on the latching lever 34, which is normally spring pressed in a counterclockwise direction. The operator may then move the jaws of the hot wire clamp into tight engagement with the wire by twisting the stick while the parts are in the position of Fig. 4.

It is a fact, however, that the clamp stick rarely has its pole disposed axially of the clamping screw 40, and the actual position of the clamp stick and hot wire clamp is better illustrated in Fig. 12, where it will be apparent that the interlocking eyes permit a universal movement between the clamp stick and the eye screw as the jaws of the hot wire clamp are driven home.

Of even greater importance is the fact that the present clamp stick is provided with jaws which separate and are adapted to produce an opening at the end of the tool between the jaws, as distinguished from hooks and other devices which I have also made and tested and which were shown in my parent application.

With such hook devices the operator frequently finds that after he has driven the clamping eye screw home he is unable, in a position such as that shown in Fig. 12, to free the clamp stick from the eye screw. For example, if the opening in a hook device were disposed at the point $a$ (Fig. 12), it will be evident that the upper part marked $b$ would engage the opposite side of the eye of the eye screw and prevent the operator from lifting the clamp stick to remove it. He would have to turn back and loosen the screw a half turn until the opening in the hook were at $b$ and the closed part at $a$, so that he could free the stick by moving it downward. This inevitably results in loose connections, and one of the most important advantages of the present device is that the clamping eye screw on the hot wire clamp can always be driven home and the clamp securely fastened on the wire, and the clamp stick released while the operator is standing on a platform or clinging to the side of a power line pole by spurs and reaching out in a lateral direction with the clamp stick.

Fig. 13 shows how the jaws open and how it merely takes an axial movement of the clamp stick handle to withdraw the jaws from an eye screw in any position. This feature cannot be too much emphasized, as it enables the firm securement of a hot wire clamp and easy removal of the clamp stick under all conditions.

Of course, the present clamp stick is also adapted to hold the clamp securely and prevent any possibility of a clamp dropping from the clamp stick while it is being used because it requires an intentional depression of the tail 38 on the latch S to move the part 32 out of engagement with the body 22 to permit the sleeve to move up into the position to open the jaws. With the necessity for a positive actuation of the latch to open the jaws, there is no chance whatever of unintentional dropping of the hot wire clamp.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A clamp stick comprising a pole, a socket carried by one end portion of the pole, work engaging means movable within and lengthwise of the socket, a member slidable on the pole and operatively connected with the work engaging means to permit said work engaging means to be extended or retracted with respect to the socket upon the pole, a stop pivotally carried by the pole for swinging movement toward or from the pole, said stop when in one position coacting with the member to prevent movement of the work engaging means to the limit of its outward movement, said stop when shifted to a second position offering no hindrance to the further movement of the member to fully extend the work engaging means.

2. A clamp stick comprising a pole, a socket carried by one end portion of the pole, work engaging means movable within and lengthwise of the socket, a member slidable on the pole and operatively connected with the work engaging means to permit said work engaging means to be extended or retracted with respect to the socket upon the pole, a stop pivotally carried by the pole for swinging movement toward or from the pole, said stop when in one position coacting with the member to prevent movement of the work engaging means to the limit of its outward movement, said stop when shifted to a second position offering no hindrance to the further movement of the member to fully extend the work engaging means, and means for normally maintaining said stop in its first position.

3. A clamp stick comprising a pole, a socket carried by one end portion of the pole, work engaging means movable within and lengthwise of the socket, a member slidable on the pole and operatively connected with the work engaging means to permit said work engaging means to be extended or retracted with respect to the socket upon the member, a movable stop carried by the pole, said stop when in one position coacting with the member to prevent movement of the work engaging means to the limit of its outward movement, said stop when shifted to a second position offering no hindrance to the further movement of the member to fully extend the work engaging means, said stop comprising an arm pivoted to the pole, automatic means for normally maintaining said arm in its first position, and a finger piece for moving the arm to its second position.

4. A clamp stick comprising a pole, a socket carried by one end portion of the pole, work engaging means movable within and lengthwise of the socket, a member slidable on the pole and operatively connected with the work engaging means to permit said work engaging means to be extended or retracted with respect to the socket upon the member, a movable stop carried by the pole, said stop when in one position coacting with the member to prevent movement of the work engaging means to the limit of its outward movement, said stop when shifted to a second position offering no hindrance to the further movement of the member to fully extend the work engaging means, said stop comprising an arm pivoted to the pole, automatic means for normally maintaining said arm in its first position, and a finger piece for moving the arm to its second position, said slidable member having a socket to receive said arm when said arm is in its second position.

5. In a clamp stick for high tension line men, the combination of a pair of elongated insulating handle members, the first of said handle members being slidably mounted with respect to the second of said handle members, a metal sleeve carried by the second of said handle members at one end thereof, a guide member slidably mounted in said sleeve and carried by the first of said handle members, said guide member having a pair of pivotally mounted jaws carried thereby and adapted to be withdrawn into said sleeve, said jaw members having their ends laterally turned toward each other to form an eye when the jaws are closed, spring means carried by said guide member and engaging a part of each of said jaw members for urging said jaw members apart, the outer surfaces of said jaw members being engaged by the upper edge of said sleeve to pivot said jaw members inwardly toward each other when the first of said handle members is moved with respect to the second of said handle members, to draw said guide into said sleeve.

6. In a clamp stick for use on high voltage lines and the like, the combination of an elongated insulating pole with a metal socket member carried by one end of said pole, said metal socket member having a cruciform opening in its upper end and having slidably mounted therein a crosshead member fixedly secured to a second insulating pole extending parallel to the first pole, a pair of curved jaw members pivotally mounted in opposed relation on said crosshead, and spring means carried by said crosshead and engaging said jaw members in such manner as to urge them to open position, said jaw members forming an eye of such a size that the eye is adapted to be received in said socket, said jaw members being so arranged with respect to said crosshead and said cruciform socket that the walls of said socket at the end of said socket member engage the outside of said jaw members to force them toward each other against the compression of said spring when the crosshead is drawn into said socket member, said clamp stick having three positions, one with its crosshead at its uppermost position with the jaws open, a second position with the crosshead retracted and the jaws closed to form an eye for universal engagement with the eye of the hot wire clamp, and a third position in which the jaw members are drawn into the socket, pulling the eye of the hot wire clamp into the socket sufficiently so that the clamp has its lower part engaged with the top of said socket member, said socket member engaging on the opposite sides of a part carried by a hot wire clamp to prevent rotation between the hot wire clamp and the clamp stick in the third position.

7. In a clamp stick for use on high voltage lines and the like, the combination of an elongated insulating pole with a metal socket member carried by one end of said pole, said metal socket member having a cruciform opening in its upper end and having slidably mounted therein a crosshead member fixedly secured to a second insulating pole extending parallel to the first pole, a pair of curved jaw members pivotally mounted in opposed relation on said crosshead, and spring means carried by said crosshead and engaging said jaw members in such manner as to urge them to open position, said jaw members forming an eye of such a size that the eye is adapted to be received in said socket, said jaw members being so arranged with respect to said crosshead and said cruciform socket that the walls of said socket at the end of said socket member engage the outside of said jaw members to force them toward each other against the compression of said spring when the crosshead is drawn into said socket member, said clamp stick having three positions, one with its crosshead at its uppermost position with the jaws open, a second position with the crosshead retracted and the jaws closed to form an eye for universal engagement with the eye of the hot wire clamp, and a third position in which the jaw members are drawn into the socket, pulling the eye of the hot wire clamp into the socket sufficiently so that the clamp has its lower part engaged with the top of said socket member, said socket member engaging on the opposite sides of a part carried by a hot wire clamp to prevent rotation between the hot wire clamp and the clamp stick in the third position, and stop means for securing the said poles in any of said three positions.

8. In a clamp stick for use on high voltage lines and the like, the combination of an elongated insulating pole with a metal socket member carried by one end of said pole, said metal socket member having a cruciform opening in its upper end and having slidably mounted therein a crosshead member fixedly secured to a second insulating pole extending parallel to the first pole, a pair of curved jaw members pivotally mounted in opposed relation on said crosshead, and spring means carried by said crosshead and engaging said jaw members in such manner as to urge them to open position, said jaw members forming an eye of such a size that the eye is adapted to be received in said socket, said jaw members being so arranged with respect to said crosshead and said cruciform socket that the walls of said socket at the end of said socket member engage the outside of said jaw members to force them toward each other against the compression of said spring when the crosshead is drawn into said socket member, said clamp stick having three positions, one with its crosshead at its uppermost position with the jaws open, a second position with the crosshead retracted and the jaws closed to form an eye for universal engagement with the eye of the hot wire clamp, and a third position in which the jaw members are drawn into the socket, pulling the eye of the hot wire clamp into the socket sufficiently so that the clamp has its lower part engaged with the top of said socket member, said socket member engaging on the opposite sides of a part carried by a hot wire clamp to prevent rotation between the hot wire clamp and the clamp stick in the third position, and stop means for securing the said poles in any of said three positions, said stop means including a handle carried by the second pole, and slidably mounted on the first pole, and having a threaded member for engaging a part carried by the first pole.

HENRY W. BODENDIECK.